United States Patent
Itagi

(10) Patent No.: US 8,059,354 B2
(45) Date of Patent: Nov. 15, 2011

(54) TRANSDUCER FOR DATA STORAGE DEVICE

(75) Inventor: Amit Vasant Itagi, Seven Fields, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 456 days.

(21) Appl. No.: 12/361,777

(22) Filed: Jan. 29, 2009

(65) Prior Publication Data

US 2010/0188768 A1   Jul. 29, 2010

(51) Int. Cl.
*G11B 5/02* (2006.01)
(52) U.S. Cl. ............... 360/59; 369/13.13; 369/13.17
(58) Field of Classification Search ............ 360/59; 369/13.13, 13.02; 385/129.31; 250/201.3
See application file for complete search history.

(56) References Cited

U.S. PATENT DOCUMENTS

| | | |
|---|---|---|
| 4,917,462 A | 4/1990 | Lewis et al. |
| 4,947,034 A | 8/1990 | Wickramasinghe et al. |
| 4,994,818 A | 2/1991 | Keilmann |
| 5,004,307 A | 4/1991 | Kino et al. |
| 5,121,256 A | 6/1992 | Corle et al. |
| 5,125,750 A | 6/1992 | Corle et al. |
| 5,272,330 A | 12/1993 | Betzig et al. |
| 5,286,970 A | 2/1994 | Betzig et al. |
| 5,286,971 A | 2/1994 | Betzig et al. |
| 5,602,820 A | 2/1997 | Wickramasinghe et al. |
| 5,664,036 A | 9/1997 | Islam |
| 5,883,872 A | 3/1999 | Kino |
| 5,930,434 A | 7/1999 | Mowry et al. |
| 5,982,716 A | 11/1999 | Kino et al. |
| 6,043,940 A | 3/2000 | Kamiyama et al. |
| 6,055,220 A | 4/2000 | Mamin et al. |
| 6,091,694 A | 7/2000 | Späth |
| 6,275,453 B1 | 8/2001 | Ueyanagi et al. |
| 6,298,026 B1 | 10/2001 | Suzuki et al. |
| 6,320,708 B1 | 11/2001 | Ueyanagi et al. |
| 6,396,776 B1 | 5/2002 | Ueyanagi |
| 6,408,123 B1 | 6/2002 | Kuroda et al. |
| 6,473,385 B1 | 10/2002 | Saito |
| 7,272,079 B2 | 9/2007 | Challener |
| 7,894,308 B2 * | 2/2011 | Peng et al. ............... 369/13.33 |

(Continued)

FOREIGN PATENT DOCUMENTS

EP   1128372 A2   8/2001

(Continued)

OTHER PUBLICATIONS

S. M. Mansfield et al., "Solid Immersion Microscope," *Appl. Phys. Lett*, vol. 57, No. 24, Dec. 10, 1990, pp. 2615-2616.

(Continued)

*Primary Examiner* — Amir Zarabian
*Assistant Examiner* — Min Huang
(74) *Attorney, Agent, or Firm* — Robert P. Lenart, Esq.; Benjamin T. Queen, II; Pietragallo Gordon Alfano Bosick & Raspanti, LLP

(57) ABSTRACT

An apparatus includes a metallic transducer and a condenser for directing electromagnetic radiation onto the transducer. The transducer includes a first section and a second section, wherein the first section is wider than the second section and has a width to length aspect ratio greater than or equal to a width to length aspect ratio of the second section, the first section having a dimple formed on a surface thereof.

20 Claims, 4 Drawing Sheets

U.S. PATENT DOCUMENTS

| | | | |
|---|---|---|---|
| 2001/0004348 A1 | 6/2001 | Ueyanagi | |
| 2001/0009541 A1 | 7/2001 | Ueyanagi | |
| 2002/0056816 A1 | 5/2002 | Stark | |
| 2002/0080709 A1 | 6/2002 | Park et al. | |
| 2002/0114567 A1 | 8/2002 | Novotny et al. | |
| 2003/0112542 A1 | 6/2003 | Rettner et al. | |
| 2003/0128633 A1 | 7/2003 | Batra et al. | |
| 2003/0128634 A1 | 7/2003 | Challener | |
| 2003/0137772 A1 | 7/2003 | Challener | |
| 2003/0184903 A1 | 10/2003 | Challener | |
| 2004/0001394 A1 | 1/2004 | Challener et al. | |
| 2004/0001420 A1 | 1/2004 | Challener | |
| 2004/0008591 A1 | 1/2004 | Johns et al. | |
| 2005/0078565 A1 | 4/2005 | Peng et al. | |
| 2005/0135008 A1 | 6/2005 | Challener et al. | |
| 2005/0289576 A1* | 12/2005 | Challener | 720/658 |
| 2006/0077787 A1 | 4/2006 | Itagi et al. | |
| 2006/0133230 A1* | 6/2006 | Buechel et al. | 369/44.23 |
| 2010/0008208 A1* | 1/2010 | Buechel et al. | 369/112.27 |

FOREIGN PATENT DOCUMENTS

| | | |
|---|---|---|
| JP | 2001256664 | 9/2001 |

OTHER PUBLICATIONS

B. D. Terris et al., "Near-Field Optical Data Storage Using A Solid Immersion Lens," *Appl. Phys. Lett*, vol. 65, No. 4, Jul. 25, 1994, pp. 388-390.

Y. Martin et al., "Optical Data Storage Read Out at 256 Gbits/in$^2$," *Appl. Phys. Lett.*, vol. 71, No. 1, Jul. 7, 1997, pp. 1-3.

H. F. Ghaemi et al., "Surface Plasmons Enhance Optical Transmission Through Subwavelength Holes", *Physical Review B*, vol. 58, No. 11, Sep. 15, 1998, pp. 6779-6782.

K. Ueyanagi et al., "Proposal of a Near-Field Optical Head Using a New Solid Immersion Mirror," *Jpn. J. Appl. Phys.*, vol. 39, Part 1, No. 2B, Feb. 2000, pp. 888-891.

Y.-J. Kim et al., "Fabrication of Micro-Pyramidal Probe Array with Aperture for Near-Field Optical Memory Applications," *Jpn. J. Appl. Phys.*, vol. 39, Part 1, No. 3B, Mar. 2000, pp. 1538-1541.

S. Quabis et al., "Focusing Light to a Tighter Spot," *Optics Communications*, vol. 179, May 25, 2000, pp. 1-7.

R. Coehoorn et al., "Hybrid Recording," *Magnetic Storage Systems Beyond 2000*, Proceedings of the NATO-ASI on Rhodes (Greece), Jun. 2000, pp. 1-17.

T. D. Milster et al., "Super-Resolution by Combination of a Solid Immersion Lens and an Aperture," *Jpn. J. Appl. Phys.*, vol. 40, Part 1, No. 3B, Mar. 2001, pp. 1778-1782.

Y.-J. Kim et al., "Parallel Recording Array Head of Nano-Aperture Flat-Tip Probes for High-Density Near-Field Optical Data Storage," *Jpn. J. Appl. Phys.*, vol. 40, Part 1, No. 3B, Mar. 2001, pp. 1783-1789.

H. Hatano et al., "Plano-Convex Solid Immersion Mirror with a Small Aperture for Near-Field Optical Data Storage," *Optical Review*, vol. 9, No. 2, Feb. 4, 2002, pp. 66-69.

T. E. Schlesinger et al., "An Integrated Read/Write Head for Hybrid Recording," *Jpn. J. Appl. Phys.*, vol. 41, Part 1, No. 3B, Mar. 2002, pp. 1821-1824.

K. Goto et al., "Microoptical Two-Dimensional Devices for the Optical Memory Head of an Ultrahigh Data Transfer Rate and Density System Using a Vertical Cavity Surface Emitting Laser (VCSEL) Array," *Jpn. J. Appl. Phys.*, vol. 41, Part 1, No. 7B, Jul. 2002, pp. 4835-4840.

B. B. Goldberg et al., "Immersion Lens Microscopy of Photonic Nanostructures and Quantum Dots," *IEEE Journal of Selected Topics in Quantum Electronics*, vol. 8, No. 5, Sep./Oct. 2002, pp. 1051-1059.

C. W. Lee et al., "Feasibility Study on Near Field Optical Memory Using A Catadioptric Optical System," Samsung Electronics Co., Ltd., Korea, pp. WA4-1/137-WA4-3/139, Optical Data Storage vol. 8, pp. 137, 1998.

\* cited by examiner

TRANSDUCER FOR DATA STORAGE DEVICE

BACKGROUND

This invention relates to transducers for concentrating electromagnetic energy, and more particularly to such transducers for use in a data storage device.

Heat assisted magnetic recording (HAMR) has been proposed as a means by which the recording density of hard disc drives may be extended to 1 Tb/in$^2$ or higher. Current conventional hard disc drive technology is limited by the superparamagnetic limit, which causes the small magnetic grains needed for high density recording media to gradually lose their magnetization state over time due to thermal fluctuations. By using heat assisted magnetic recording, the magnetic anisotropy of the recording medium, i.e. its resistance to thermal demagnetization, can be greatly increased while still allowing the data to be recorded with standard recording fields. A laser beam heats the area on the disc that is to be recorded and temporarily reduces the anisotropy in just that area sufficiently so that the applied recording field is able to set the magnetic state of that area. After cooling back to the ambient temperature, the anisotropy returns to its high value and stabilizes the magnetic state of the recorded mark.

The main difficulty with HAMR has been discovering a technique that is able to conduct sufficient light energy into the recording medium to heat it by several hundred degrees, but only in the area that is desired to be recorded, which typically will have dimensions on the order of 25 to 50 nm if the recording density is 1 Tb/in$^2$. If the optical hot spot is larger than this area, it will extend to neighboring bits and tracks on the disc, and by heating those areas as well, the data recorded in those areas will be erased. Confining the optical spot to an area that is much smaller than a wavelength of light, and well below the so-called "diffraction limit" that can be achieved by standard focusing lenses, is an area of study called "near field optics" or "near field microscopy." Techniques have been described in the literature for confining light to 20 nm spots or smaller. However, these techniques have not demonstrated a capability for delivering a substantial amount of optical power to the sample within that small spot.

It is desirable to increase the efficiency of coupling light energy into the recording medium in order to improve manufacturing margins and enhance disc drive performance.

SUMMARY

An aspect of the present invention is to provide an apparatus that includes a metallic transducer and a condenser for directing electromagnetic radiation onto the transducer. The transducer includes a first section and a second section, wherein the first section is wider than the second section and has a width to length aspect ratio greater than or equal to a width to length aspect ratio of the second section, the first section having a dimple formed on a surface thereof.

Another aspect of the present invention is to provide a data storage device that includes a data storage medium and a recording head adjacent the medium. The device also includes an apparatus mounted adjacent to the recording head, the apparatus including a metallic transducer having a first section and a second section, wherein the first section is wider than the second section and has a width to length aspect ratio greater than or equal to a width to length aspect ratio of the second section, the first section having a dimple formed on a surface thereof. The device also includes a condenser for directing electromagnetic radiation onto the transducer.

A further aspect of the present invention is to provide a heat assisted magnetic recording system that includes a data storage medium, a recording head adjacent the medium and a condenser for generating an optical spot on the data storage medium. The system also includes a metallic transducer including a first section and a second section, wherein the first section is wider than the second section and has a width to length aspect ratio greater than or equal to a width to length aspect ratio of the second section, the first section having a dimple formed on a surface thereof, wherein the condenser directs electromagnetic radiation onto the transducer.

These and various other features and advantages will be apparent from a reading of the following detailed description.

DRAWINGS

Figure 3:
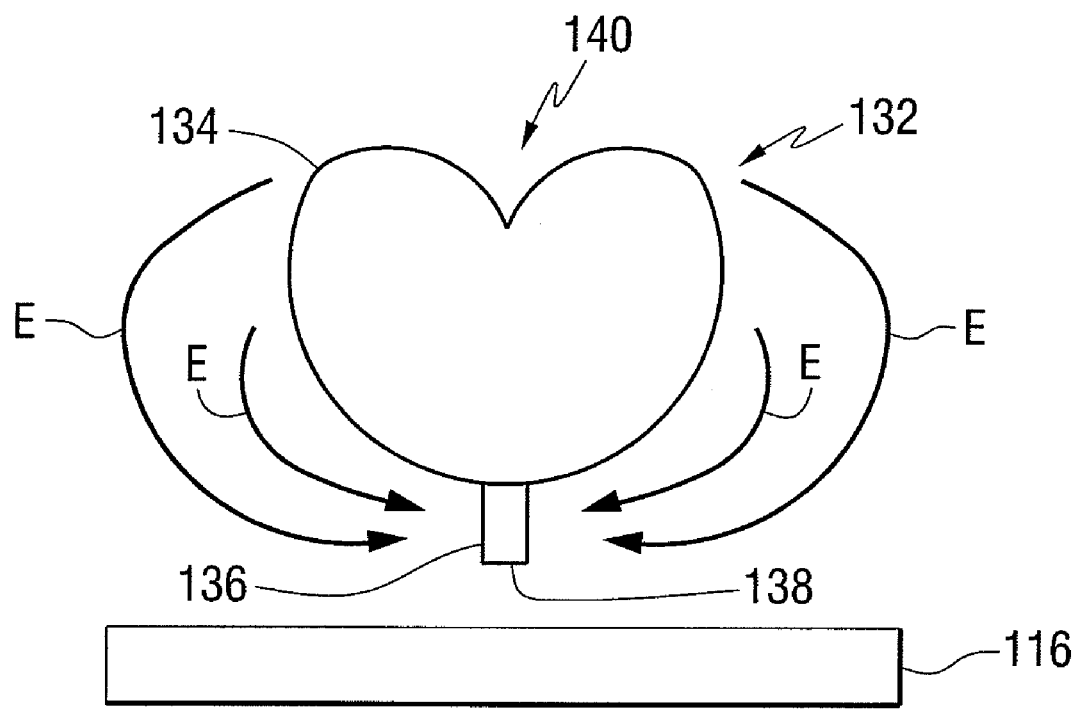
FIG. 3 illustrates a transducer, in accordance with an aspect of the invention.
Figure 5:
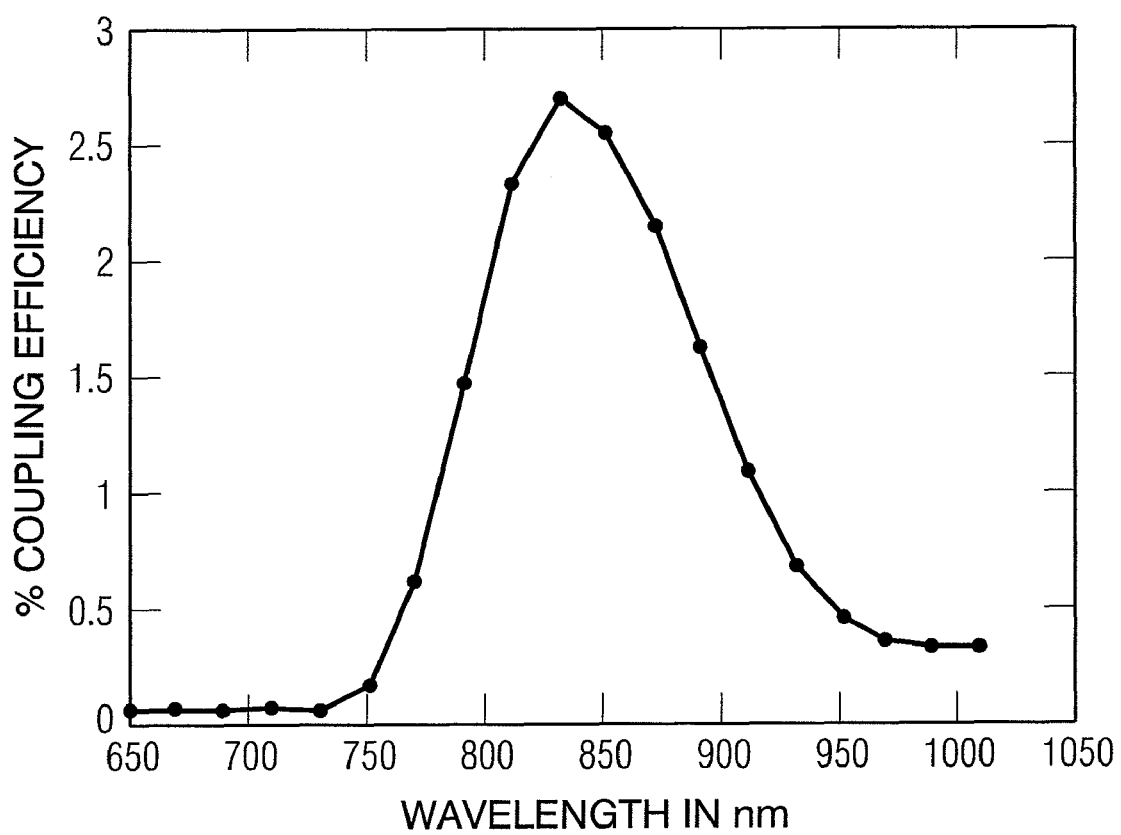

FIG. 5 graphically illustrates coupling efficiency for the transducer illustrated in FIG. 3, in accordance with an aspect of the invention.

DETAILED DESCRIPTION

Figure 1:
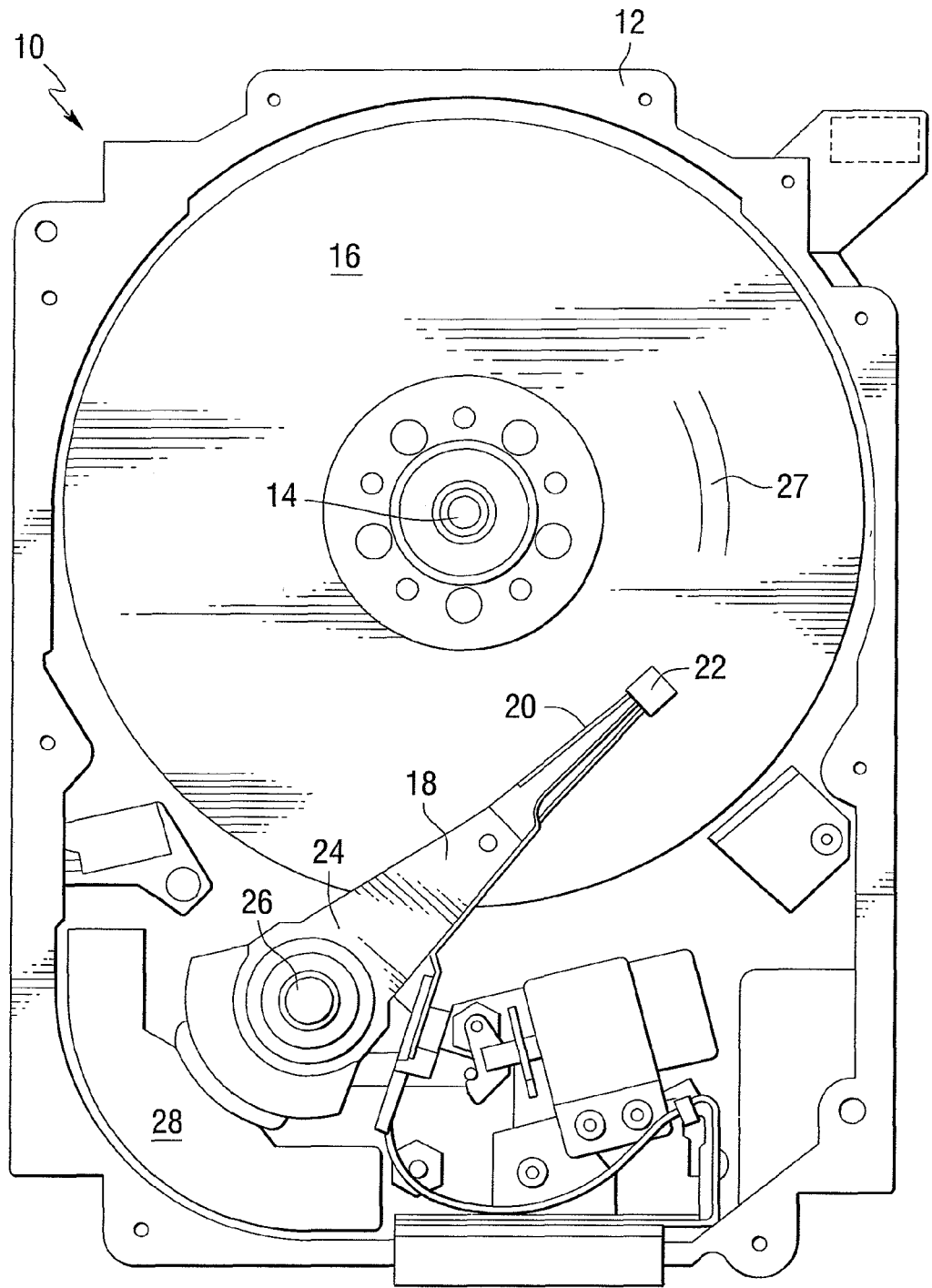
FIG. 1 is a pictorial representation of a system, in accordance with an aspect of the invention.

FIG. 1 is a pictorial representation of a system 10 that can include aspects of this invention. The system 10 includes a housing 12 (with the upper portion removed and the lower portion visible in this view) sized and configured to contain the various components of the system 10. The system 10 includes a spindle motor 14 for rotating at least one disc 16 within the housing 12. At least one actuator arm 18 is contained within the housing 12, with each arm 18 having a first end 20 with a slider 22, and a second end 24 pivotally mounted on a shaft by a bearing 26. An actuator motor 28 is located at the arm's second end 24 for pivoting the arm 18 to position the slider 22 over a desired sector 27 of the disc 16. The actuator motor 28 is regulated by a controller, which is not shown in this view and is well known in the art.

In one aspect, the invention provides transducers for concentrating electromagnetic energy. In another aspect, the invention provides an apparatus that has utility for data storage devices. In yet another aspect, the invention has utility in, for example, a heat assisted magnetic recording (HAMR) system. In a HAMR system, an electromagnetic wave of, for example, visible, infrared or ultraviolet light is directed onto a surface of a data storage medium to raise the temperature of a localized area of the medium to facilitate switching of the magnetization of the area. These and other aspects of the invention are described and illustrated herein, as well as, described and illustrated in U.S. Pat. No. 7,272,079 (to Challener issued on Sep. 18, 2007 and which is commonly owned by the assignee of the present application) the contents and fall disclosure of which are hereby fully incorporated by reference.

Referring to the drawings, FIG. 1 is a schematic representation of an apparatus 10 constructed in accordance with this invention. The apparatus includes a planar waveguide shaped in the form of a parabolic mirror (also called a condenser) 12. A first grating 14 and a second grating 16 form a split grating for coupling incident light into a waveguide. Electromagnetic radiation in the form of polarized light, illustrated by arrows 18 and 20 is directed onto the gratings. The gratings are offset by a distance, d, so that the coupled light enters the waveguide with a 180° phase shift between the two halves of the grating. Arrows 22, 24, 26 and 28 illustrate the electric field of the light. The sides of the waveguide are shaped such that the light is brought to a focus at a focal point 30. A metallic transducer 32 is positioned at the focal point. The transducer is preferably made of a metal such as gold, silver, aluminum, or copper.

In accordance with the invention and as described in more detail in U.S. Pat. No. 7,272,079 (incorporated by reference), a condenser may be, for example, a planar solid immersion mirror (P-SIM). At the focal point, the electric field of the light is polarized in a longitudinal direction which is along the axis of symmetry of the condenser. The longitudinal electric field couples strongly to the transducer when it is oriented in the same direction. The transducer is positioned adjacent to a data storage medium, such that electromagnetic radiation emitted at the end of the transducer can be used to heat a portion of the recording medium and generate an optical spot on the medium. If the transducer is chosen with the correct dimensions, particularly the correct length, then it resonates with the incident light and creates extremely large electric fields in a recording medium in the vicinity of the end of the transducer. It will be appreciated that a parabolic planar waveguide is not the only type of condenser that could be used. For example, a planar (that is two-dimensional) mode index lens would also work as long as the phase of the incident beam of light was chosen to give the correct polarization at the focus.

In addition to a planar waveguide geometry, an aspect of the invention includes a a fully three-dimensional solid immersion mirror (3D SIM) or a three-dimensional solid immersion lens (3D SIL). As used herein, the term condenser encompasses both planar and three-dimensional structures, including SIMs and SILs.

Figure 2:
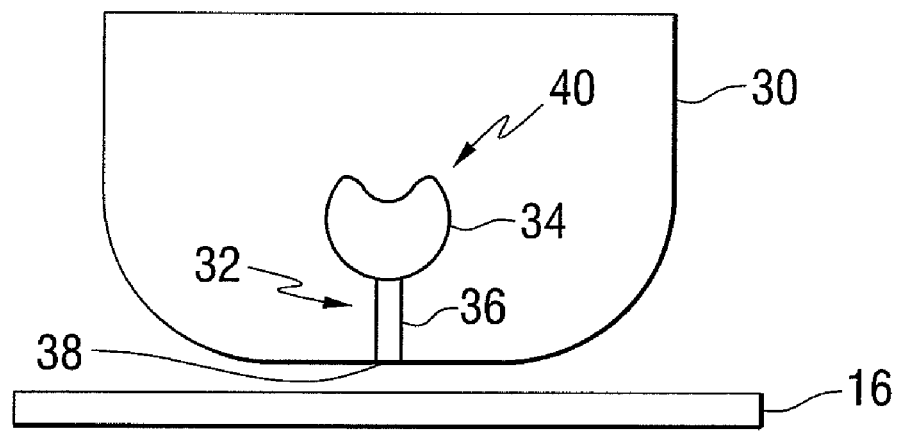
FIG. 2 illustrates an apparatus that includes a condenser and a transducer, in accordance with an aspect of the invention.

FIG. 2 illustrates an apparatus, in accordance with an aspect of the invention, which includes a condenser 30 and a transducer 32. The transducer 32 includes a first section 34, which may have for example a spherical or spheroidal shape, and a second section 36, which may be in the form of a pin. The second section 36 includes an end 38 that is positioned proximate to the storage medium 16. The second section 36 is electrically coupled to the first section 34. In one aspect, the first section 34 is wider than the second section 36 and has a width to length aspect ratio greater than or equal to a width to length aspect ratio of the second section 36. In another aspect, the first section 34 has a larger length and width than the second section 36.

Still referring to FIG. 2, the first section 34 includes a dimple 40 formed on a surface thereof. In one aspect, the dimple 40 is positioned or formed on the first section 34 generally opposite from where the second section 36 is electrically coupled to the first section 34. In one aspect, the dimple 40 may have a generally concave shape. However, it will be appreciated that the dimple 40 may take various forms or shapes so as to provide the desired effect created by the presence of the dimple, as will be explained herein.

For a transducer not having a dimple formed on the first section thereof, the predominant polarization of the incident field in the vertical direction creates a hot spot at the top of the the transducer, i.e. generally opposite where the second section is coupled to the first section. This causes the charges induced at the side of the first section to couple to the charge induced at the top of the first section. In accordance with the invention, providing the dimple 40 reduces the hot spot at the top of the first section 34 and the charges induced at the side of the first section 34 have to couple to the second section 36 which ultimately helps to improve the coupling to the medium 16. Thus, increased coupling efficency can be achieved by creating the dimple 40 on the first section 34 and tuning the shape so that the resonance is at the optical frequency of interest. These aspects of the invention are illustrated in FIGS. 3, 4 and 5 and explained herein.

FIG. 3 illustrates a transducer 132 (similar to the transducer 32 illustrated in FIG. 2), in accordance with an aspect of the invention. The transducer 132 includes a first section 134, which may have for example a spherical or spheroidal shape, and a second section 136, which may be in the form of a pin. The second section 136 includes an end 138 that is positioned proximate to the storage medium 116. The second section 136 is electrically coupled to the first section 134. The first section 134 includes a dimple 140 formed on a surface thereof. In one aspect, the dimple 140 is positioned or formed on the first section 134 generally opposite from where the second section 136 is electrically coupled to the first section 134. Electric field lines E are shown for the transducer 132 having the dimple 140 formed in the first section 134.

Figure 4:
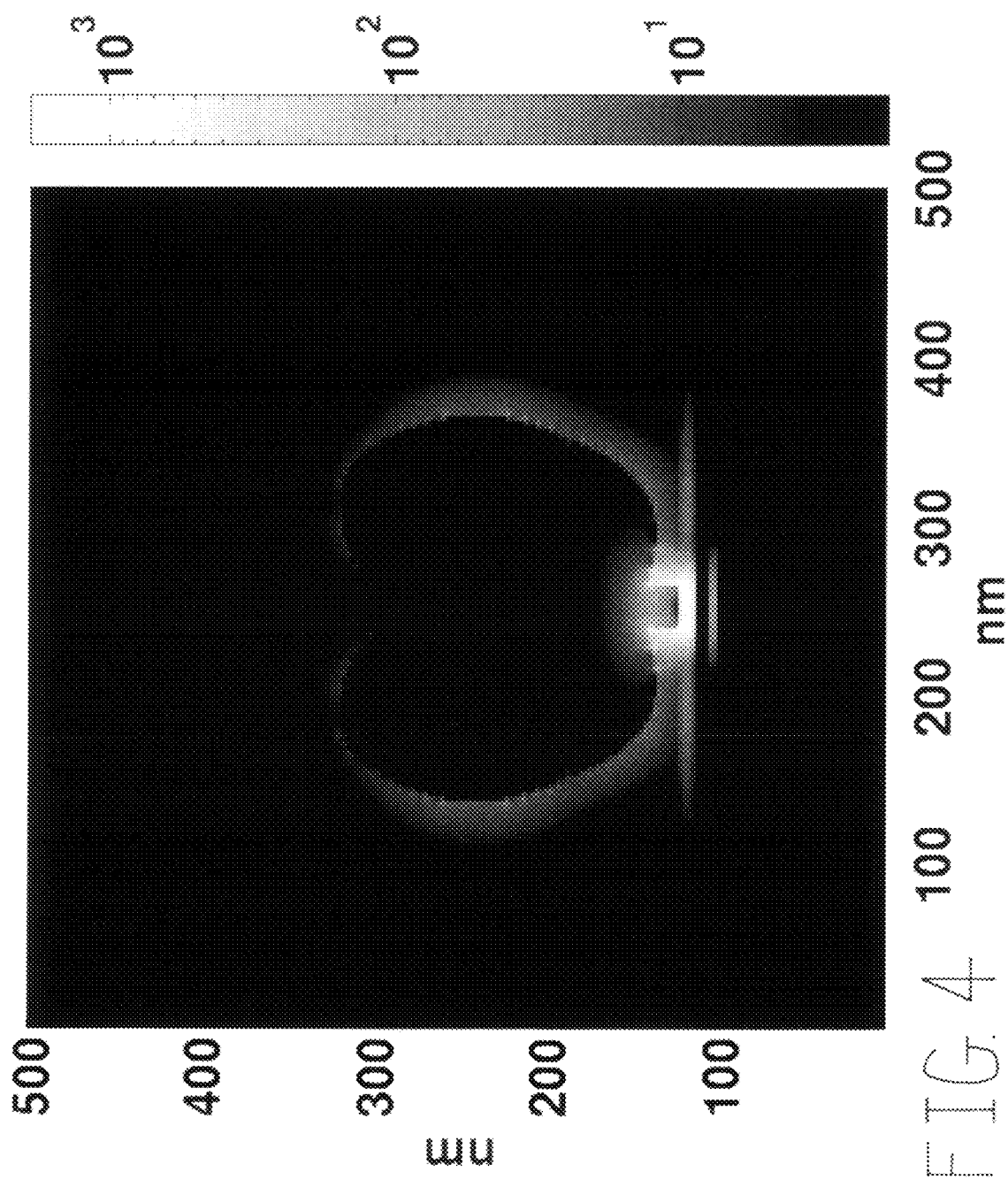
FIG. 4 illustrates the surface plasmon resonance for the transducer illustrated in FIG. 3, in accordance with an aspect of the invention.

FIG. 4 illustrates the surface plasmon resonance for the transducer 132 illustrated in FIG. 3, in accordance with an aspect of the invention. As shown, because of the dimple shape on the transducer the field intensity along the periphery of the transducer is minimized while the field intensity between the transducer and the media is maximized.

FIG. 5 graphically illustrates coupling efficiency for the transducer 132 illustrated in FIG. 3, in accordance with an aspect of the invention. For the results shown, the dimpled surface, i.e. dimple 140, was optimized to resonate at 830 mu free space wavelength.

The implementation described above and other implementations are within the scope of the following claims.

What is claimed is:

1. An apparatus comprising:
   a metallic transducer including a first section and a second section, wherein the first section is wider than the second section and has a width to length aspect ratio greater than or equal to a width to length aspect ratio of the second section, the first section having a dimple formed on a surface thereof, and
   a condenser for directing electromagnetic radiation onto the transducer.

2. The apparatus of claim 1, wherein the second section is electrically coupled to the first section.

3. The apparatus of claim 2, wherein the dimple is positioned on the first section generally opposite from where the second section is electrically coupled to the first section.

4. The apparatus of claim 1, wherein the dimple has a generally concave shape.

5. The apparatus of claim 1, wherein the condenser comprises one of: a planar waveguide or a three-dimensional waveguide.

6. The apparatus of claim 1, wherein the first section has a larger length and width than the second section.

7. A data storage device comprising:
   a data storage medium;
   a recording head adjacent to the data storage medium; and
   an apparatus mounted adjacent to the recording head, the apparatus comprising a metallic transducer including a first section and a second section, wherein the first section is wider than the second section and has a width to length aspect ratio greater than or equal to a width to length aspect ratio of the second section, the first section having a dimple formed on a surface thereof, and a condenser for directing electromagnetic radiation onto the transducer.

8. The data storage device of claim 7, wherein the second section is positioned proximate to the data storage medium.

9. The data storage device of claim 7, wherein the dimple is positioned on the first section generally opposite from the second section.

10. The data storage device of claim 7, wherein the second section is electrically coupled to the first section.

11. The data storage device of claim 10, wherein the dimple is positioned on the first section generally opposite from where the second section is electrically coupled to the first section.

12. The data storage device of claim 7, wherein the dimple has a generally concave shape.

13. The data storage device of claim 7, wherein the condenser comprises one of: a planar waveguide or a three-dimensional waveguide.

14. A heat assisted magnetic recording device, comprising:
a data storage medium;
a recording head adjacent to the data storage medium;
a condenser for generating an optical spot on the data storage medium; and
a metallic transducer including a first section and a second section, wherein the first section is wider than the second section and has a width to length aspect ratio greater than or equal to a width to length aspect ratio of the second section, the first section having a dimple formed on a surface thereof, wherein the condenser directs electromagnetic radiation onto the transducer.

15. The heat assisted magnetic recording device of claim 14, wherein the second section is positioned proximate to the data storage medium.

16. The heat assisted magnetic recording device of claim 14, wherein the dimple is positioned on the first section generally opposite from the second section.

17. The heat assisted magnetic recording device of claim 14, wherein the second section is electrically coupled to the first section.

18. The heat assisted magnetic recording device of claim 17, wherein the dimple is positioned on the first section generally opposite from where the second section is electrically coupled to the first section.

19. The heat assisted magnetic recording device of claim 14, wherein the dimple has a generally concave shape.

20. The heat assisted magnetic recording device of claim 14, wherein the condenser comprises one of: a planar waveguide or a three-dimensional waveguide.

* * * * *